Aug. 23, 1966 A. BILL 3,268,207
BLADED STRUCTURE
Filed March 22, 1965
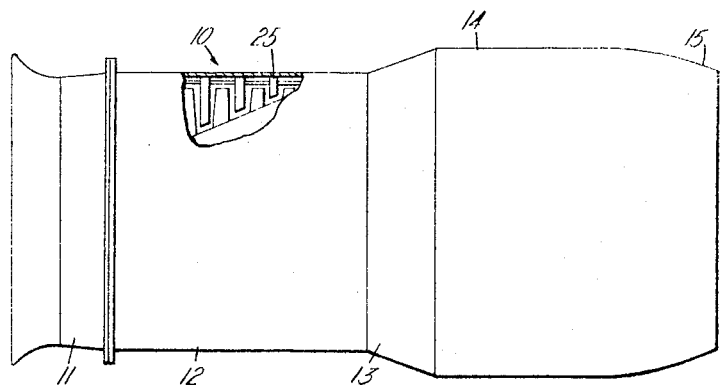
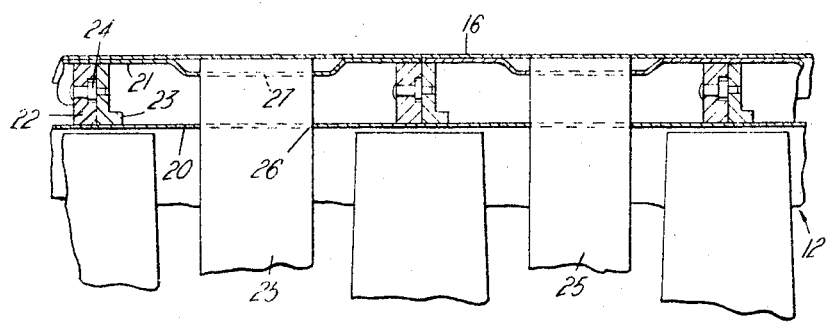
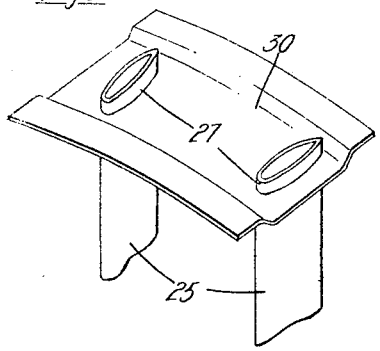
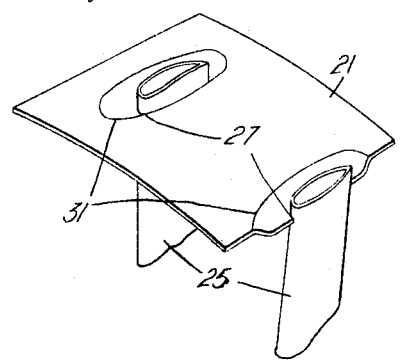
Inventor
Arthur Bill
By
Cushman, Darby & Cushman
Attorneys United States Patent Office 3,268,207
Patented August 23, 1966

3,268,207
BLADED STRUCTURE
Arthur Bill, Derby, England, assignor to Rolls-Royce Limited, Derby, England, a British company
Filed Mar. 22, 1965, Ser. No. 441,587
Claims priority, application Great Britain, May 7, 1964, 19,119/64
3 Claims. (Cl. 253—78)

This invention concerns a bladed structure such, for example, as a gas turbine engine compressor.

According to the present invention, there is provided a bladed structure comprising concentric inner and outer casings, annular spacers by means of which the two casings are spaced from each other, the two casings having holes for the reception of aerofoil-shaped blades and the outer casing having grooved portions in which its holes are disposed. A plurality of angularly spaced apart aerofoil-shaped blaes are closely mounted in the holes in the two casings, each blade being bonded to the outer casing. The outer casing is closely mounted within an external casing against which the outer ends of the blades abut. The inner and outer casings, and the external casing as well as the spacers and the blades are all formed of synthetic resin material and are cemented to each other.

The outer casing may be provided with at least one annular circumferential groove. Alternatively the outer casing may be provided with at least one ring of angularly spaced apart grooves, one for each respective hole.

The annular spacers may be constituted by pairs of annular spacer members which are dowelled together.

The bladed structure may be constituted by a gas turbine engine compressor, the said blades being stator blades thereof.

The invention also comprises a gas turbine vertical lift engine having a thrust to weight ratio of at least 8:1, the said engine being provided with a bladed structure as set forth above.

The term "vertical lift engine" as used in this specification is intended to indicate an engine adapted to produce vertical lift forces on an aircraft independently of those generated areodynamically by forward flight of the aircraft.

The invention is illustrated, merely by way of example, in the accompanying drawings, in which:

FIGURE 1 is a diagrammatic view, partly in section of a gas turbine vertical lift engine provided with a compressor in accordance with the present invention, FIGURE 2 is a broken away sectional view on a larger scale of part of the compressor of the engine of FIGURE 1, FIGURE 3 is a perspective view of part of a structure shown in FIGURE 2, and FIGURE 4 is a perspective view of an alternative.

Referring first to FIGURE 1–3, a gas turbine vertical lift engine 10 comprises in flow series an intake 11, a compressor 12, combustion equipment 13 and a turbine 14, the turbine exhaust gases being directed to atmosphere through an exhaust duct 15. The engine 10 has a thrust to weight ratio of at least 8:1 and may have a thrust ratio of at least 12:1. Thus it can have a thrust to weight ratio of 16:1 or even more.

The compressor 12 has an external synthetic resin casing 16. Within the external casing 16 there are mounted concentric inner and outer casings 20, 21 respectively.

The casings 20, 21 are also formed of synthetic resin material, the outer casing 21 being cemented to the external casing 16.

The inner and outer casings 20, 21 are spaced from each other by pairs of annular spacing members 22, 23 which are also formed of synthetic resin material and are cemented to each other. The spacers 22, 23 of each said pair are also connected together by dowells 24.

The compressor 12 is provided with a plurality of stages of angularly spaced apart aerofoil-shaped stator blades 25. Each blade 25 is closely mounted in a hole 26 in the inner casing 20 and in a hole 27 in the outer casing 21, the outer ends of the blades 25 abutting the external casing 16.

As will be seen from FIGURE 3, the outer casing 21 is provided with a plurality of axially spaced, annular, circumferential grooves 30, one for each stage of stator blades 25. The holes 27 in the outer casing 21 are disposed in the grooves 30.

The blades 25 are of synthetic resin material and are cemented to the outer casing 21, the grooves 30 forming a receptacle for such cement.

In FIGURE 4 there is illustrated an alternative in which the outer casing 21 is provided with rings of angularly spaced apart grooves 31, a separate groove 31 being provided for each of the holes 27.

It will be appreciated that the structure shown in the drawings is well adapted to give maximum strength to the synthetic resin structure and at the same time to provide easily accessible areas in which to effect cementing of the blades 25.

I claim:

1. A bladed structure comprising concentric inner and outer casings, annular spacers by means of which the two casings are spaced from each other, the two casings having holes for the reception of aerofoil-shaped blades and the outer casing having grooved portions in which the said holes are disposed, a plurality of angularly spaced apart aerofoil-shaped blades which are closely mounted in the said holes in the two casings, each blade being bonded to the said outer casing, and an external casing within which the outer casing is closely mounted and against which abut the outer ends of the blades, the inner and outer casings, the external casing, the spacers and the blades being all formed of synthetic resin material and being cemented to each other.

2. A bladed structure comprising concentric inner and outer casings, pairs of annular spacers which are dowelled together and by means of which the two casings are spaced from each other, the two casings having holes for the reception of aerofoil-shaped blades and the outer casing having an annular circumferential groove in which the said holes are disposed, a plurality of angularly spaced apart aerofoil-shaped blades which are closely mounted in the said holes in the two casings, each blade being bonded to the said outer casing, and an external casing within which the outer casing is closely mounted and against which abut the outer ends of the blades, the inner and outer casings, the external casing, the spacers and the blades being all formed of synthetic resin material and being cemented to each other.

3. A bladed structure comprising concentric inner and outer casings, pairs of annular spacers which are dowelled together and by means of which the two casings are spaced from each other, the two casings having holes for the reception of aerofoil-shaped blades and the outer casing having at least one ring of angularly spaced apart grooves, one for each respective hole, a plurality of angularly spaced apart aerofoil-shaped blades which are closely mounted in the said holes in the two casings, each blade being bonded to the said outer casing, and an external casing within which the outer casing is closely mounted and against which abut the outer ends of the blades, the inner and outer casings, the external casing, the spacers and the blades being all formed of synthetic resin material and being cemented to each other.

References Cited by the Examiner

UNITED STATES PATENTS 2,345,918   4/1944   Dahlstrand.

FOREIGN PATENTS 695,724   8/1953   Great Britain.

MARTIN P. SCHWADRON, *Primary Examiner.*

SAMUEL LEVINE, *Examiner.*

E. A. POWELL, *Assistant Examiner.*